Patented Jan. 4, 1949

2,457,866

UNITED STATES PATENT OFFICE 2,457,866

CONDENSATION OF ALCOHOLS

Clare A. Carter, South Charleston, W. Va., assignor to Carbide and Carbon Chemicals Corporation, a corporation of New York No Drawing. Application May 26, 1945,
Serial No. 596,079

14 Claims. (Cl. 260—642)

This invention relates to the production from primary and secondary alcohols of alcohols of higher molecular weight; and more especially it concerns the production of the higher molecular weight aliphatic alcohols from one or more lower alcohols by a process providing higher overall yields than heretofore have been obtainable.

Processes already are known for the condensation of primary and secondary alcohols and mixtures thereof to form other alcohols of higher molecular weight involving the condensation of the lower molecular weight alcohol or alcohols in the presence of an alkaline condensation catalyst. Such processes were conducted either in the vapor phase or in the liquid phase, generally under high superatmospheric pressure in an attempt to improve the yields of the higher alcohols. However, so far as can be determined, this method for the production of higher molecular weight alcohols has never been used commercially, principally because of the low overall yields secured by such processes, the inordinate expense involved in the use of metallic sodium and the like in the production of the condensation catalyst, and the relatively high yields of undesirable byproduct organic acids.

Among the more important objects of the present invention are: to provide for producing from primary alcohols, with or without secondary aliphatic alcohols, other higher molecular weight alcohols under conditions greatly improving the overall yield of such higher alcohols, while minimizing the formation of salts of organic acids and other byproducts; and to provide such a process wherein the inhibiting effect of the water formed in the condensation reaction upon the production of the higher alcohols is greatly reduced or minimized.

This invention is based in important part upon the discovery that the high ratios of the salts of fatty acids to higher alcohols secured in priorknown alcohol condensation processes have been due to the failure to remove in such condensations the water of condensation as it is formed, whereby the starting alcohol is oxidized to the corresponding saturated organic acid. By removing the water of reaction as rapidly as formed it has been found possible to control and raise the overall yield of the higher alcohols in high degree, and to minimize the production of salts of organic acids. Example I is based upon a run wherein 36 mols of 2-methyl-7-ethylundecanol-4 was obtained for each mol of the sodium salt of the 2-ethylhexanoic acid made; and Example II is based upon a run wherein the molar ratio of 2-ethylhexanol-1 to sodium butyrate produced was 15.75 to 1.

According to one modification of the invention, a primary monohydric aliphatic alcohol, or a mixture of such alcohols, containing between 3% and 15% of a condensation catalyst, such as an alcoholate of an alkali metal or alkaline earth metal, and a small amount of a dehydrogenation catalyst is heated with agitation, in the absence of added hydrogen, preferably to a temperature ranging from around 120° C. to around 300° C., in the kettle of a still capable of operating at pressures as high as 100 pounds per square inch, gauge. The still is connected with a fractionating column leading to a condenser and a decanter whereby water vapor formed in the condensation reaction may be condensed and removed from the system, while any alcohol distilled off and condensed is returned to the column. The mixture of reactants is refluxed at temperatures and pressures providing a reaction rate which commonly converts the starting alcohol to the higher alcohol at a rate of around 1% to 4% conversion of the former per hour. During this reaction period the water vapor formed in the condensation is removed as rapidly as formed, usually in conjunction with some of the alcohol. The mixed vapors are condensed, whereupon the condensate separates into layers, the lower layer being a solution composed of alcohol and water which may be removed. The upper alcohol layer is returned to the column.

Commonly, the condensation reaction is conducted under atmospheric pressure, although somewhat higher pressures up to 100 pounds per square inch may be effectively employed, particularly when employing the less active dehydrogenation catalysts such as zinc and zinc oxide. When utilizing pressures greater than atmospheric, the pressures are regulated and maintained by vent control of the small amount of hydrogen usually formed in the condensation reaction under these pressures.

Concurrently with the production of the higher aliphatic saturated alcohols there are produced in the process small amounts of unsaturated olefinic alcohols having structures otherwise corresponding to the saturated higher alcohols produced. The unsaturated alcohol content often ranges from around 4% to 20% of the total higher alcohol content. Thus, in Example I, there is produced with the 2-methyl-7-ethylundecanol-4 a yield of about 9% of 2-methyl-7-ethylundecen-6-ol-4. In Example VI there was produced with the 2-butyloctanol-1 a yield of about 4.6% of 2- butylocten-2,ol-1. The mixtures of higher alcohols may advantageously be hydrogenated in well-known manner as with hydrogen in the presence of a hydrogenation catalyst such as those named herein, at elevated temperatures and pressures, thereby converting the unsaturated or olefinic alcohols to the corresponding saturated alcohols (hydrogen pressures around 500–1,000 pounds per square inch, and temperatures around 100°–150° C., in conjunction with a nickel catalyst, may conveniently be used); or the saturated and unsaturated alcohols may be separately recovered from the condensation reaction mixture.

In one modification of the process, a primary monohydric aliphatic alcohol and a secondary monohydric aliphatic alcohol having the hydroxyl group and a methyl group connected with the same carbon atom are cross-condensed in the presence of an alcoholate of an alkali metal or an alkaline earth metal and of a dehydrogenation catalyst, with the production of a higher molecular weight secondary aliphatic alcohol.

In another important modification, two or more primary aliphatic alcohols, having an unsubstituted methylene group in the alpha position, are cross-condensed in the presence of such a mixed catalyst, with the production of mixtures of higher molecular weight primary alcohols.

The condensation reaction in the presence of the condensation catalyst and the dehydrogenation catalyst usually is allowed to proceed until from 40% to 70% of the starting alcohol or alcohols have been converted to the higher alcohol or alcohols, after which the condensation reaction is discontinued. The crude reaction mixture containing the higher molecular weight alcohols in excellent yields then is refined, preferably by steam distillation, or by washing the reaction mixture with water, after which the mixture is fractionated under subatmospheric pressure, and the higher alcohols recovered.

In a preferred modification of the process, a particularly effective type of condensation catalyst is formed in situ in the alcohol or mixture of alcohols to be condensed, prior to the main, condensation stage. In that form of the invention, a dry or anhydrous primary aliphatic alcohol is reacted with a caustic alkali, such as caustic soda, preferably in powdered form, to form the corresponding alcoholate, by refluxing the alcohol-caustic soda slurry or solution in a column still. Sufficient of the alkali preferably is used to react with between 3% and 15% of the alcohol. The water formed by this reaction converting the caustic alkali to the corresponding salt of the primary alcohol is distilled off and removed as a constant boiling mixture of the alcohol and water. This mixture is condensed, and the condensate is permitted to separate in a decanter into a water layer which is eliminated, and an alcohol layer which is returned to the column.

After the alcoholate-forming reaction is approximately 95% or more complete, as determined by measuring the amount of water of reaction produced and removed, the dehydrogenation catalyst is added to the reaction mixture. At this stage, in instances where a second aliphatic alcohol is to be cross-condensed with the initial alcohol, the second alcohol also is introduced into the still, usually in successive increments to assist in the control of the desired reaction temperature. However, if desired, a portion up to 100% of the second alcohol may be present with the initial alcohol prior to the treatment with the caustic alkali.

After introducing the dehydrogenation catalyst, the reaction mixture is heated, in the absence of added hydrogen, usually at temperatures ranging from somewhat below the atmospheric boiling point of the starting alcohols to temperatures substantially below those at which, under the pressure conditions employed, the starting alcohols are in vapor phase. During this reaction period, the water formed in the condensation is distilled off as rapidly as formed, and is condensed and eliminated.

When the reaction has proceeded to a point providing a satisfactory conversion of the starting alcohols to the higher alcohol, the condensation reaction is discontinued, and the crude reaction mixture is refined in the manner already described.

The following examples serve to illustrate the invention. In the examples, all parts are given by weight.

*Example I*

A mixture of 2,335 parts by weight of 2-ethylhexanol-1 and 89 parts of powdered caustic soda was refluxed at 183° C.–190° C. under atmospheric pressure until 95% of the caustic soda had reacted with the alcohol to form an alcoholate, as evidenced by the amount of water of reaction formed and removed. Then 2,375 parts of 4-methylpentanol-2 and 1 part of an equimolar mixture of zinc dust and zinc oxide were added to the reaction mixture and the reaction continued for a period of 31 hours, a kettle temperature of 175° C. at atmospheric pressure being maintained by controlling the rate of addition of the 4-methylpentanol-2. Water formed during the reaction was removed as rapidly as formed, 231 parts of water of reaction being thus removed. The reaction mixture was washed with water and then fractionated under an absolute pressure of from 50 to 10 millimeters of mercury. A yield of 2,225 parts of high boiling alcohols was secured, consisting of 2-methyl-7-ethylundecanol-4 and a small amount of 2-methyl-7-ethylundecen-6-ol-4. This corresponds to a yield of high boiling alcohols of around 58%, based upon the 2-ethylhexanol, with an efficiency of around 88%. The high boiling alcohol fraction had an A. S. T. M. distillation range of from 259° C. to 266° C. under atmospheric pressure, and a specific gravity at 20/20° C. of 0.834.

*Example II*

Under conditions generally similar to those recited in Example I, excepting that superatmospheric pressure was used, 358 parts of butanol-1 and 23 parts of a 50% aqueous solution of caustic soda were refluxed in a column still at a temperature of 117° C.–120° C. under atmospheric pressure until substantially 95% of the caustic soda had reacted with the butanol to form sodium butylate, as determined by the amount of water formed, which was removed as rapidly as formed, and recovered. One part of zinc dust was then mixed with the reaction mixture, and the condensation reaction continued for 23 hours at a temperature of 180° C. under a pressure at the beginning of the run of 63 pounds per square inch, gauge, the temperature being maintained at 180° C. by gradually reducing the pressure in the still to 43 pounds per square inch, gauge.

The resultant liquid was refined by steam distillation, and then fractionated, yielding 116 parts of a fraction having an A. S. T. M. distillation range of from 180.2° C. to 184.8° C., and a specific gravity at 20/20° C. of 0.836, and consisting of 2-ethylhexanol-1, and a small amount of 2-ethylhexene-2-ol-1. This corresponds to a yield of these higher alcohols of around 37%, with an efficiency of around 87%.

Example III

Following in general the procedure described in Example I, but employing a very active dehydrogenation catalyst, 441 parts of butanol and 6.7 parts of powdered caustic soda were refluxed in a column still at atmospheric pressure until 3.4% of sodium butylate had been formed in butanol solution, the water vapor being removed as rapidly as formed. One part of "Raney" nickel catalyst of the type described in the Raney Patent No. 1,628,190 then was added to the reaction mixture, and the latter was reacted for 26 hours at atmospheric pressure and at a temperature within the range between 120° C. and 130° C. After 19 parts of water of reaction had been distilled off and removed, water was added to the reaction mixture and the latter was steam distilled. Fractionation of the distillate yielded 119 parts of high boiling alcohols consisting of 2-ethylhexanol-1 and a small amount of 2-ethylhexene-2-ol-1, and corresponding to a yield of around 31% at an efficiency of 75%.

Example IV

Following the procedure described in Example I, 798 parts of 2-ethylbutanol-1 and 25 parts of powdered caustic soda were refluxed under atmospheric pressure at a temperature of 149° C.–160° C. until approximately 95% of the caustic soda had reacted, as determined by water of reaction formed and measured. Thereafter 395 parts of 5-ethylnonanol-2, 1 part of zinc dust and 1.33 parts of cupric oxide were added to the mixture, and refluxing of the mixture continued at a temperature of 164° C.–170° C. for 23 hours, during which time 33 parts of water were distilled off as rapidly as formed. Upon washing the reaction mixture with water, and fractionating the washed mixture under an absolute pressure of 5 millimeters of mercury, there were recovered 320 parts of high boiling alcohols consisting of 3,9-diethyltridecanol-6 and a small amount of 3,9-diethyltridecenenol-6. This corresponds to a yield of 54% based upon the 5-ethylnonanol-2 starting material. The alcohol fraction had an A. S. T. M. distillation range of from 289° C. to 311° C. at atmospheric pressure and a specific gravity at 20/20° C. of 0.8468.

Example V

Following in general the procedure of Example I, a mixture of 215 parts of butanol-1 and 10 parts of powdered caustic soda was refluxed at atmospheric pressure until 8.6% of the alcohol had been converted to sodium butylate, while continuously removing water formed in the reaction. Thereafter 217 parts of n-hexanol-1, 1 part of zinc dust and 1 part of zinc oxide were added to the reaction mixture and the latter refluxed for 33 hours at a temperature of from 191° C. to 213° C., under a superatmospheric pressure of around 48 pounds per square inch, gauge, while continuously removing water formed in the reaction, until 21.5 parts of water had been removed. The reaction mixture was then washed with water, and was steam distilled at atmospheric pressure until the unreacted butanol was distilled off. The mixture in the kettle then was permitted to stratify and the aqueous layer containing caustic soda and salts was removed. The residual mixture was fractionated under a reduced pressure of 10 millimeters of mercury, absolute, yielding 61 parts of 8 carbon alcohols, principally 2-ethylhexanol-1, 37 parts of 12 carbon alcohols, principally 2-butyloctanol-1, and 93 parts of a mixture of decanols (principally 2-ethyloctanol-1 and 2-butylhexanol-1). The decanol mixture had an A. S. T. M. distillation range of from 210° C. to 231° C. at atmospheric pressure, and a specific gravity at 20/20 C. of 0.8340. The total yield of $C_8$, $C_{10}$ and $C_{12}$ aliphatic alcohols was around 50.2%, of which about half were decanols.

Example VI

A mixture of 1,305 parts of n-hexanol-1 and 20 parts of powdered caustic soda was defluxed, with continuous removal of water formed in the reaction, until 3.9% of the alcohol had been converted to the alcoholate, as determined by the water of reaction continuously removed as formed. Thereafter one part of zinc dust and 1.2 parts of zinc oxide were added to the reaction mixture and the mixture reacted for 14 hours under a pressure of 28 pounds per square inch, gauge, and at 205° C., while continuously removing the water of reaction as rapidly as formed. Thus, 47 parts of water of reaction were eliminated. The resultant reaction mixture was washed with water, and was fractionated under an absolute pressure of 4 millimeters of mercury. There were recovered 498 parts of high boiling alcohols consisting of 2-butyloctanol-1 and a small amount of 2-butyloctene-2-ol-1. This alcohol fraction had an A. S. T. M. boiling range of from 245° C. to 251° C. at atmospheric pressure, and had a specific gravity at 20/20° C. of 0.8360. This corresponds to a yield of 42% at an efficiency of 75%.

Example VII

A mixture of 1,255 parts of n-octanol-1 and 40 parts of powdered caustic soda was refluxed under atmospheric pressure at a temperature of from 198° C. to 205° C. until substantially 95% of the caustic soda had reacted with the alcohol, as determined by the water of reaction produced and isolated as formed. Thereafter one part of zinc dust was added to the reaction mixture, and the reaction mixture was maintained at a temperature within the range from 198° C. to 250° C. at atmospheric pressure, for 22 hours, during which time 65 parts of water of reaction were removed as rapidly as formed. The crude reaction mixture, after washing with water, was fractionally distilled under an absolute pressure of 5 millimeters of mercury. There were recovered 726 parts of high boiling alcohol fraction consisting of 2-hexyldecanol-1 and a small amount of 2-hexyldecene-2-ol-1, and corresponding to a yield of around 62.6%, based on the octanol. This alcohol fraction had an A. S. T. M. boiling range of from 300° C. to 314° C. at atmospheric pressure, and a specific gravity at 20/20° C. of 0.8378.

Example VIII

A mixture of 1,033 parts of 2-ethylhexanol-1 and 20 parts of powdered caustic soda was charged into the kettle of a column still and refluxed under atmospheric pressure at a temperature ranging from 183° C. to 190° C. while continuously removing moisture formed in the reaction until 6.3% of the alcohol had been converted to the alcoholate. Then 207 parts of 5-ethylnonanol-2 and 1 part of zinc stearate were added to the mixture, and the latter was heated for 31 hours at a temperature of from 193° C. to 213° C. at atmospheric pressure, the water formed in the reaction being removed as rapidly as formed. During this period 622.5 additional parts of the ethylnonanol were added in small increments, and 71 parts of water were formed and removed. Upon washing the crude kettle product with water, and fractionating the washed mixture under an absolute pressure of 4 millimeters of mercury, there were recovered 808 parts of high boiling alcohols consisting of 5,11-diethylpentadecanol-8 and a small amount of 5,11-diethylpentadeceneol-8. This corresponds to a yield of around 46% based upon the 2-ethylhexanol. This high boiling alcohol fraction had a boiling point of 327° C. at atmospheric pressure, and a specific gravity at 20/20° C. of 0.8445.

While it is advantageous to employ alkaline condensation catalysts of the caustic alkali type mentioned in the examples, it will be understood that other alkaline condensation catalysts may be employed, such as the alkali metal carbonates, silicates, borates and oxides. It is believed probable that all such compounds are converted to alcoholates which are the active catalysts for this condensation.

Other dehydrogenation catalysts may be substituted for those specifically mentioned herein. Among suitable catalysts may be mentioned oxides of iron, cobalt, nickel, tin and manganese; nickelous carbonate; copper acetate and stearate; and salts of the foregoing metals with other organic acids which are known to be hydrogenation-dehydrogenation catalysts; and powdered nickel-aluminum alloys.

It is preferred to conduct the condensation reaction at atmospheric pressure, particularly where it is done in the presence of the more active dehydrogenation catalysts such as "Raney" nickel. However, it is sometimes advantageous to use low superatmospheric pressures when employing a dehydrogenation catalyst of relatively low activity for condensing alcohol mixtures boiling under atmospheric pressure at temperatures so low that the catalyst is not sufficiently activated to provide a practical reaction rate. On the other hand, it has been found that, if a highly active dehydrogenation catalyst such as "Raney" nickel is used at high temperatures and under superatmospheric pressures, there commonly results an inordinate formation of esters, followed by their saponification to the sodium salts of organic acids.

The milder dehydrogenation catalysts such as zinc and the zinc compounds, iron oxides and salts of manganese are preferred for condensations at the higher temperatures around 140° C. and above, and for those processes wherein superatmospheric pressures are used.

It will be understood that, while the examples disclose the production of a particular type of condensation catalyst in the form of an alkali metal alcoholate prior to the addition of the dehydrogenation catalyst to the alcohol mixture in the initial stage of the condensation reaction producing higher alcohols, it is within the scope of the invention to introduce at the beginning of the condensation reaction catalytic amounts of previously formed alkali metal alcoholates or other alkaline condensation catalysts in conjunction with the dehydrogenation catalyst.

As previously emphasized, an important feature of the invention found essential for the securing of satisfactory yields of the higher molecular weight alcohols is the removal of water formed in the condensation reaction as rapidly as formed. Otherwise, it has been clearly established that characteristic side reactions cause the formation of salts of organic acids and other materials, thereby preventing the attainment of high overall yields of the desirable higher molecular weight alcohols being sought.

The invention is susceptible of modification within the scope of the appended claims.

I claim:

1. Process for producing higher molecular weight aliphatic alcohols from an alcohol having at least one hydrogen atom on the alpha carbon atom, which comprises heating and reacting at least one such aliphatic primary monohydric alcohol of lower molecular weight, including a primary alcohol having a least four carbon atoms, with a small amount of a caustic alkali, while refluxing the mixture and continuously removing from the reaction mixture water as rapidly as it is formed in the resultant reaction, when approximately at least 95% of the caustic alkali has reacted with the alcohol, adding a dehydrogenation catalyst to the reaction mixture and continuing the heating and refluxing of the mixture while continuously removing from the reaction mixture water as rapidly as it is formed in the resultant condensation reaction, and recovering from the reaction mixture the higher molecular weight alcohol present therein.

2. Process for producing a higher molecular weight aliphatic alcohol, which comprises heating and reacting at atmospheric pressure, at least one aliphatic primary monohydric alcohol, having at least four carbon atoms and sufficient caustic alkali to react with between 3% and 15% of such alcohol, while refluxing the mixture and continuously removing from the latter water as rapidly as it is formed in the reaction, after at least approximately 95% of the caustic alkali has reacted, adding a dehydrogenation catalyst to the reaction mixture, and heating the mixture at a temperature within the range between 120° C and 300° C., and at atmospheric pressure, while continuously removing from the reaction mixture water as rapidly as it is formed in the condensation reaction, and recovering from the last-named reaction mixture the higher molecular weight aliphatic alcohol thus produced.

3. Process for producing higher molecular weight aliphatic alcohols, which comprises heating and condensing at least one aliphatic primary monohydric alcohol having at least four carbon atoms with a small amount of an alkaline compound of an alkali metal, while refluxing the mixture and continuously removing from the reaction mixture water as rapidly as it is formed in the resultant reaction, when approximately at least 95% of the alkaline compound has reacted with the alcohol, adding a dehydrogenation catalyst to the reaction mixture and heating and refluxing the mixture, while correlating the temperature and pressure to provide a reaction rate corresponding to the conversion of from 1% to 4% of said primary alcohol per hour to a higher molecular weight aliphatic alcohol, as measured by the water formed in the resultant condensation reaction, and while continuously removing from the reaction mixture water as it is formed, and recovering from the resultant reaction mixture the higher molecular weight aliphatic alcohol present therein.

4. Process for producng higher molecular weight aliphatic alcohols, which comprises condensing an aliphatic primary monohydric alcohol of lower molecular weight having at least four carbon atoms, at a temperature within the range between 120° C. and 300° C., in the absence of added hydrogen, and in the presence of an alkaline condensation catalyst and of a dehydrogenation catalyst, while continuously removing overhead from the reaction mixture the water as rapidly as it is formed in the resultant condensation reaction, and recovering from the resultant reaction mixture the higher molecular weight aliphatic alcohol thus produced.

5. Process for producing higher molecular weight aliphatic alcohols, which comprises heating and reacting a mixture of aliphatic monohydric alcohols, at least one of which is a primary alcohol having at least four carbon atoms, at a temperature within the range between 120° C. and 300° C., in the presence of an alkaline alcoholate and of a dehydrogenation catalyst, while refluxing the mixture and continuously removing from the reaction mixture water as rapidly as it is formed in the resultant condensation reaction, and isolating from the reaction mixture the higher molecular weight aliphatic alcohol present therein.

6. Process for producing higher molecular weight aliphatic alcohols, which comprises condensing at least one aliphatic saturated monohydric alcohol including a primary alcohol having at least four carbon atoms, under atmospheric pressure, at a temperature within the range between around 120° C. and around 300° C., in the presence of an alkaline condensation catalyst and a dehydrogenation catalyst containing a zinc atom, removing from the resulted reaction mixture the water formed in the condensation reaction as rapidly as formed while maintaining the said mixture within such temperature range, and recovering from the reaction mixture the higher molecular weight aliphatic alcohol thus produced.

7. Process for producing higher molecular weight aliphatic alcohols, which comprises condensing a primary monohydric alcohol having at least four carbon atoms and a secondary monohydric alcohol having a methyl group directly connected with the carbon atom carrying the hydroxyl group, at a temperature within the range between around 120° C. and 300° C. under atmospheric pressure, in the presence of an alkaline condensation catalyst and a dehydrogenation catalyst, while removing from the resultant reaction mixture the water vapor formed in the condensation reaction as rapidly as formed, and recovering from the reaction mixture a higher molecular weight aliphatic alcohol thus produced.

8. Process for producing higher molecular weight aliphatic alcohols, which comprises condensing at least one aliphatic monohydric alcohol including a primary alcohol having at least four carbon atoms, at a temperature within the range between about 120° C. and 300° C., and under a pressure not substantially higher than about 100 pounds per square inch, gauge, in the presence of an alkali metal alcoholate and a zinc-containing dehydrogenation catalyst, removing from the resultant reaction mixture the water formed in the condensation reaction as rapidly as formed, and recovering from the reaction mixture a higher molecular aliphatic alcohol thus produced.

9. Process for producing higher molecular weight aliphatic alcohols, which comprises condensing at least one monohydric alcohol including a primary alcohol having at least four carbon atoms, at a temperature within the range between about 120° C. and 300° C., and under a pressure not substantially higher than about 100 pounds per square inch, gauge, in the presence of an alkali metal alcoholate, zinc and zinc oxide, removing from the resultant reaction mixture the water formed in the condensation reaction as rapidly as formed, and recovering from the reaction mixture a higher molecular aliphatic alcohol thus produced.

10. Process for producing higher molecular weight aliphatic alcohols, which comprises condensing at least one aliphatic monohydric alcohol including a primary alcohol having at least four carbon atoms, at a temperature within the range between about 120° C. and 300° C., and under a pressure not substantially higher than about 100 pounds per square inch, gauge, in the presence of an alkali metal alcoholate and zinc, removing from the resultant reaction mixture the water formed in the condensation reaction as rapidly as formed, and recovering from the reaction mixture a higher molecular aliphatic alcohol thus produced.

11. Process for producing higher molecular weight aliphatic alcohols, which comprises condensing at least one aliphatic monohydric alcohol including a primary alcohol having at least four carbon atoms, at a temperature within the range between about 120° C. and 300° C., and under atmospheric pressure, in the presence of an alkali metal alcoholate and a nickel catalyst, removing from the resultant reaction mixture the water formed in the condensation reaction as rapidly as formed, and recovering from the reaction mixture a higher molecular aliphatic alcohol thus produced.

12. Process for producing higher molecular weight aliphatic alcohols, which comprises condensing a primary monohydric alcohol having at least four carbon atoms with a secondary monohydric alcohol having two hydrogen atoms connected with the carbon atom adjacent the carbon atom directly connected with the hydroxyl group, at a temperature within the range between around 120° C. and 300° C., and under a low pressure not substantially higher than about 100 pounds per square inch, gauge, in the presence of an alkali metal alcoholate of said primary alcohol and a dehydrogenation catalyst comprising zinc, removing from the resultant reaction mixture the water formed in the condensation reaction as rapidly as formed, and recovering from the reaction mixture the higher molecular weight aliphatic alcohol thus produced.

13. Process for producing higher molecular weight saturated aliphatic alcohols, which comprises heating and reacting at least one primary monohydric aliphatic alcohol having at least four carbon atoms, in the presence of a dehydrogenation catalyst and of an alcoholate selected from the group consisting of alcoholates of the alkali metals and alkaline earth metals, while continuously removing from the resultant reaction mixture the water formed in the condensation reaction as rapidly as formed, thereby producing a mixture containing saturated and unsaturated higher molecular weight aliphatic alcohols, subjecting such mixture to hydrogenation in the presence of a hydrogenation catalyst, thereby converting the unsaturated aliphatic alcohol to the corresponding saturated alcohol, and recovering from the mixture the higher molecular weight saturated aliphatic alcohols.

14. Process for producing higher molecular weight saturated aliphatic alcohols, which comprises heating and reacting at least one primary monohydric aliphatic alcohol having at least four carbon atoms, in the presence of a dehydrogenation catalyst and of an alkaline condensation catalyst, while continuously removing from the resultant reaction mixture the water formed in the condensation reaction as rapidly as formed, thereby producing a mixture containing saturated and unsaturated higher molecular weight aliphatic alcohols, subjecting such mixture to hydrogenation in the presence of a hydrogenation catalyst, thereby converting the unsaturated aliphatic alcohol to the corresponding saturated alcohol, and recovering from the mixture the higher molecular weight saturated aliphatic alcohols.

CLARE A. CARTER.

REFERENCES CITED

The following references are of record in the file of this patent:

UNITED STATES PATENTS

| Number | Name | Date |
|---|---|---|
| 2,050,789 | Fuchs | Aug. 11, 1936 |
| 2,092,450 | Fuchs | Sept. 7, 1937 |

OTHER REFERENCES

Weizmann, "Chemistry and Industry," 1937, pages 587–591.